United States Patent
Shioya

(10) Patent No.: US 7,463,418 B2
(45) Date of Patent: Dec. 9, 2008

(54) POLARIZATION ELEMENT UNIT AND POLARIZATION LIGHT EMITTING APPARATUS

(75) Inventor: Sayu Shioya, Kanagawa (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 286 days.

(21) Appl. No.: 11/259,197

(22) Filed: Oct. 27, 2005

(65) Prior Publication Data
US 2006/0092512 A1 May 4, 2006

(30) Foreign Application Priority Data
Oct. 28, 2004 (JP) ............... 2004-314056

(51) Int. Cl.
*G02B 5/30* (2006.01)
*F21V 9/14* (2006.01)
*G03B 27/72* (2006.01)

(52) U.S. Cl. .............. 359/486; 362/19; 355/71
(58) Field of Classification Search .......... 359/486
See application file for complete search history.

(56) References Cited

U.S. PATENT DOCUMENTS

| 2,224,214 | A | * | 12/1940 | Brown ............. 359/486 |
| 4,289,381 | A | * | 9/1981 | Garvin et al. ........ 427/163.1 |
| 6,243,199 | B1 | | 6/2001 | Hansen et al. |
| 6,307,609 | B1 | * | 10/2001 | Gibbons et al. ........ 349/124 |
| 6,532,111 | B2 | | 3/2003 | Kurtz et al. |
| 6,874,899 | B2 | | 4/2005 | Leidig et al. |
| 7,227,684 | B2 | * | 6/2007 | Wang et al. .......... 359/486 |
| 2004/0008310 | A1 | * | 1/2004 | Leidig et al. ........ 349/124 |
| 2006/0061862 | A1 | * | 3/2006 | Mi et al. ........... 359/486 |

FOREIGN PATENT DOCUMENTS

| JP | 3344058 B2 | 9/1995 |
| JP | 2004-144884 | 5/2004 |
| JP | 2004-177904 A | 6/2004 |

* cited by examiner

Primary Examiner—Arnel C. Lavarias
Assistant Examiner—Jade Callaway
(74) Attorney, Agent, or Firm—Rader, Fishman & Grauer, PLLC

(57) ABSTRACT

In the present wire grid polarization element unit and polarized light emitting apparatus, it is possible to prevent non-polarized light, which has bad extinction ratio from leaking from end portions of polarization elements. Specifically, in a frame, wire grid polarization elements are aligned and light shielding members are provided on end portions of the polarization elements. In addition, without the shielding members, the wire grid polarization elements may be overlapped each other. Further, a rotation unit may be provided in order to rotate the polarization elements with respect to an optical axis of light so that a direction of grid of each polarization element can be parallel to each other.

17 Claims, 18 Drawing Sheets

Conveying Direction of Photo-Alignment Film

POLARIZATION ELEMENT UNIT AND POLARIZATION LIGHT EMITTING APPARATUS

TECHNICAL FIELD OF THE INVENTION

The present invention relates to a polarization element unit using a wire grid polarization element, and a polarized light exposure apparatus in which photo-alignment is carried out on a photo-alignment film, such as a photo-alignment layer of a viewing angle compensation film, using a photo-alignment film of a liquid crystal display element or an ultraviolet curing type liquid crystal.

DESCRIPTION OF RELATED ART

In recent years, the technology called "photo-alignment" relating to a process for photo-aligning, for example, a photo-alignment film of a liquid crystal panel, or a photo-alignment layer of a viewing angle compensation film, is increasingly adopted, in which alignment is carried out by irradiating polarized light of a predetermined wavelength to the photo-alignment film.

Hereinafter, a film having a film or layer for carrying out photo-alignment by light is collectively called a "photo-alignment film." The photo-alignment film is getting wider as a liquid crystal panel is getting larger, and a polarized light emitting apparatus, which irradiates a polarized light to a photo-alignment film, is also larger.

The above-mentioned photo-alignment film, for example, a viewing angle compensation film is a belt-like and long work piece, which is cut out by a desired length after an alignment processing so as to be used. Recently, since the size of such a photo-alignment film becomes large according to a panel size, there is also a photo-alignment film with a width of 1500 mm.

In order to perform a photo-alignment on such a belt-like long photo-alignment film, in recent years, a polarized light emitting apparatus in which a wire grid type polarization element with a rod-shaped lamp is proposed. Refer to, for example, Japanese Laid Open Patent Nos. 2004-163881 and 2004-144884.

FIG. 16 shows an example of a polarized light emitting apparatus having a polarization unit in which a wire grid polarization element is combined with a rod-shaped lamp, which is a liner light source.

The lamp 21 such as a high-pressure mercury lamp or a metal halide lamp and a light emitting unit 20 which is equipped with the gutter-shaped condensing mirror 22 having an ellipse shape in a cross-sectional view, which reflects light from the rod-shaped lamp 21 are arranged so that the longitudinal direction of the lamp 21 becomes the width direction (a direction perpendicular to a feeding direction) of the photo-alignment film 31 formed on the workpiece 30. A wire grid polarization unit 100 with which a wire grid polarization element is combined is disposed in the light emitting unit 20. The wire grid polarization unit 100 has a rectangle shape, one side of which is a little longer than the luminescence length of the lamp 21, and is disposed so that the longitudinal direction is in agreement with the longitudinal direction of the lamp 21.

The rod-shaped lamp 21 is arranged so that the longitudinal direction thereof is conformed to the longitudinal direction of the gutter-shaped condensing mirror 22 and the position of the lamp 21 is also conformed to the first focal position of the gutter-shaped condensing mirror 22 having an ellipse shape in a cross-sectional view, and, the photo-alignment film 31 formed on the workpiece 30 is arranged on the second focal position of the gutter-shaped condensing mirror 22.

The workpiece 30 is, for example, a long continuous work piece, and is wound around a supply roller R1 in the shape of a roll, in which the workpiece W is pulled out from the supply roller R1 and conveyed under the bottom of the light emitting unit 20, and then is rolled round by a take-up roller R2.

When the workpiece 30 is conveyed under the bottom of the light emitting unit, the light from the rod-shaped lamp 21, which is polarized by the wire grid polarization unit 100, is emitted on the photo-alignment film 31 of the workpiece 30, thereby carrying out the photo-alignment processing.

For example, such a wire grid polarization element is described in Japanese Laid Open Patent Nos. 2002-328234 and 2003-508813 in details.

FIG. 17A is a perspective view of an overview of the wire grid polarization element which forms the wire grid polarization unit 100, and FIG. 17B is a side view thereof, wherein two or more linear electric conductors 1a whose length is much longer than the width thereof are in parallel arranged on a substrate 1b made of, for example, quartz glass. The pitch P of the electric conductors 1a, is preferably equal to a wavelength of incident light or less, preferably ⅓ of the wavelength or less. Where the above-mentioned polarization element is inserted into an electromagnetic wave, most polarization wave (polarization light) components parallel to the longitudinal direction of the grid 1a are reflected, and the polarization wave (polarization light) component perpendicular thereto pass through it.

The present wire grid polarization element is less dependent on incident angle of extinction ratio of a polarized light (an angle of light which is incident to a polarization element), and even in case of diffusive light, such as light emitted from a rod-shaped lamp, polarized light having good extinction ratio can be obtained if the value of the incident angle is in a range of ±45 degrees.

Therefore, if the length of the rod-shaped lamp is made equivalent to the width of a photo-alignment film, and a photo-alignment film is relatively moved to polarized light emitting apparatus, theoretically photo-alignment processing of a belt-like long photo-alignment film can be performed by one lamp. Moreover, an optical element for making light emitted from a lamp parallel also becomes unnecessary, so that the miniaturization of the apparatus is possible.

As described above, the interval of the grid of the wire grid polarization element may be required to be equal to or less than the wavelength of light to be polarized, preferably ⅓ of the wavelength.

Currently, ultraviolet rays with a wavelength of 280 to 320 nm are used for a photo-alignment. Therefore, the nano-processing technology, which forms an about 100 nm grid, is required for the wire grid polarization element, which is used for the polarized light emitting apparatus for photo-alignments.

Therefore, using the lithography technology and etching technology, which is used for semiconductor manufacturing, a grid is formed on a glass substrate (glass wafer), which is cut in an appropriate size.

However, the size of the substrate which a processing apparatus, such as a deposition apparatus a lithography apparatus, and an etching system used for semiconductor manufacture can process, is to about φ300 mm in the present circumstances, and a large-sized polarization element which can process a workpiece having a large area cannot be manufactured.

However, as in Japanese Laid Open Patent No. 2004-144884, when a large polarization element fitting for a long rod-shaped light source with a long luminescence area, for example, a rod-shaped high-pressure mercury lamp and a metal halide lamp with a length of 1500 mm, is required, the wire grid polarization element which is cut out of a glass substrate is formed as polarizers one by one, and two or more of such polarizers are arranged so that the directions of their grids are matched with each other, so as to put these polarizers along with the longitudinal direction of a lamp, thereby using it as one polarization element.

For example, Japanese Patent No. 3,344,058 discloses another example, in which wire grid polarization elements are arranged side by side.

SUMMARY OF THE INVENTION

However, in case of aligning wire grid polarization elements, there is a problem set forth below.

As described above, the wire grid polarization elements are cut from a glass substrate one by one. Therefore, since minute chips and unevenness are produced on the edge of each wire grid polarization element, in case of bringing the polarization elements in abutting contact with each other, direct light from a light source, that is, non-polarized light leaks through gaps therebetween whereby the extinction ratio thereof is worsened.

Moreover, chips near the edge causes deficit of the grid, so that the extinction ratio worsens in the circumferential portion of the polarization element.

When light having poor extinction ratio is irradiated into the photo-alignment film, the liquid crystal photo-alignment direction of the portion cannot be desirably arranged, thereby causing defective product.

FIG. 18 shows the extinction ratio (relative value) and irradiance distribution in the light emitting area in case that two wire grid polarization elements, which are cut from a glass substrate, are aligned. In the figure, the horizontal axis shows the position of a lamp in a longitudinal direction thereof, and the vertical axis shows an illuminance, wherein a point A of the figure is the butt-aligned portion (boundary portion) of the polarization elements.

In addition, the distance from the polarization element to a light exposed surface is 35 mm.

As shown in this figure, the extinction ratio is getting worse in the boundary portion of the polarization element. This is attributed to the fact that the non-polarized light emitted from a light source leaks through the gap between the polarization elements.

In addition, the extinction ratio is a rate of P polarized light and S polarized light contained in a polarized light. Worsening of the extinction ratio means that the light becomes close to a non-polarized light.

Moreover, since cutting is carried out by machine processing when a wire grid polarization element is cut from a glass wafer, even if the cutting planes are in parallel aligned at right angle to the direction of a grid, it is difficult to process it to an accuracy of, for example, 100 nm, and misalignment may be generated by about ±0.5 degree with respect to a grid extending direction. Therefore, if the edges are butt-aligned as they are, the polarization elements aligned in the grid direction are slightly shifted to each other, whereby the directions of polarized light axes of the polarizing elements are shifted to each other.

Therefore, it becomes impossible to arrange the direction of a photo-alignment of liquid crystal to a desired direction, thereby causing a defective product.

In view of the above problem, it is an object of the present invention to prevent non-polarized light or polarized light having poor extinction ratio from leaking through the boundary portion of the polarization elements in a polarization element unit that is formed by aligning wire grid polarization elements.

It is another object of the present invention to a provide polarization element unit for preventing polarization elements from shifting to each other in the direction of polarizing axis of polarized light.

It is a further object of the present invention to provide a polarizing light emitting apparatus capable of carrying out photo-alignment of photo-alignment film by using the polarization element unit.

The above problems is solved as follows:

(1) A polarization element unit is constructed so that wire grid polarization elements are aligned in a frame so that non-polarized light does not leak.

A shielding portion(s) may be provided so as to cover an abutting portion(s) of the wire grid polarization elements in an alignment direction so that non-polarized light does not leak from the abutting portion of the polarization elements.

In addition, in order to prevent polarization elements from shifting to each other with respect to a direction of a polarization axis of polarized light, a rotation unit for rotating the wire grid elements with respect to an optical axis of light emitted onto a photo-alignment film from the linear light source may be provided.

(2) In an polarized light emitting apparatus having a linear light source, the above polarization element unit may be used as a polarization element so as to polarize light emitted from the linear light source by the above-mentioned polarization element unit, and emit the polarized light on to a photo-alignment film thereby carrying out photo-alignment.

According to the present invention, the following advantages are expected:

(1) A light shielding portion is formed on an end portion of the wire grid polarization element in the photo-alignment direction or end portions of polarization elements in the alignment direction of the polarization elements are overlapped each other so that non-polarized light is not irradiated from the end portions of the wire grid polarization elements in the alignment direction, thereby preventing the extinction ratio of the polarized light emitted from the end portion of the polarization elements in the alignment direction from decreasing.

(2) By providing a unit to rotate the polarization element in a frame, it is possible to adjust the grid directions of the polarization elements so as to be parallel to each other, so that the direction of the polarized light, which is emitted from the polarization unit, can be aligned.

(3) By using the polarization element unit having the above structure as a polarization unit of a polarized light emitting apparatus, the light, which is emitted from the liner light source, is polarized without reducing the extinction ratio partially, a photo-alignment film is irradiated, so that a photo-alignment can be performed.

Moreover, by using a liner light source and the wire grid polarization element unit having a rectangle shape whose one side is longer than the length of the luminescence area of the a liner light source which is used as a polarization unit, it is possible to perform photo-alignment of a relatively large photo-alignment film.

Thus, there are a number of advantages and there is no requirement that a claim be limited to encompass all of objects and the advantages.

In addition, the foregoing has outlined rather broadly the features and technical advantages in order that the detailed description of the invention that follows may be better understood. Additional features and advantages will be described hereinafter which form the subject of the claims.

DESCRIPTION OF THE DRAWINGS

For a more complete understanding of the present unit and apparatus, and the advantages thereof, reference is now made to the following description taken in conjunction with the accompanying drawings, in which.

DETAILED DESCRIPTION OF THE INVENTION

A description will now be given, referring to embodiments thereof. While the claims are not limited to such embodiments, an appreciation of various aspects of the invention is best gained through a discussion of various examples thereof.

Figure 1A:
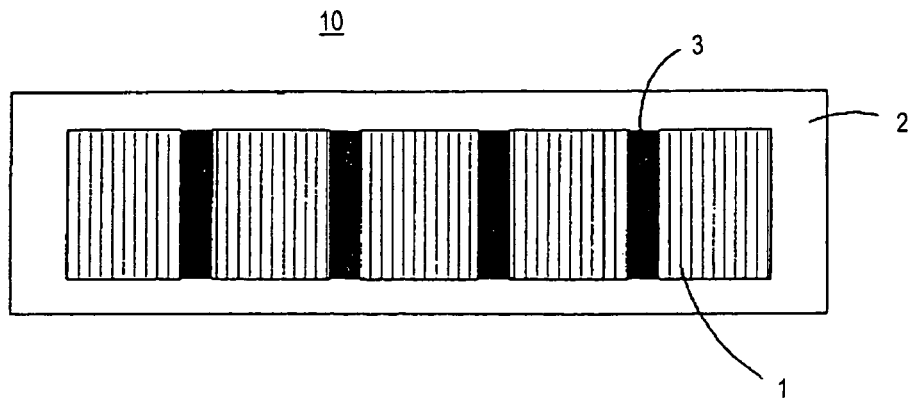
FIG. 1A is a schematic view of a polarization element unit 10 according to a first embodiment of the present invention, which is viewed from the optical axis direction of emitted light.
Figure 1B:
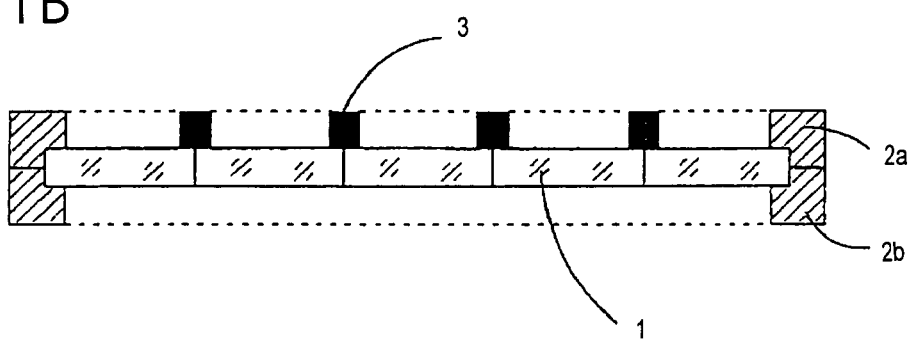
FIG. 1B is a side view thereof.
Figure 1C:
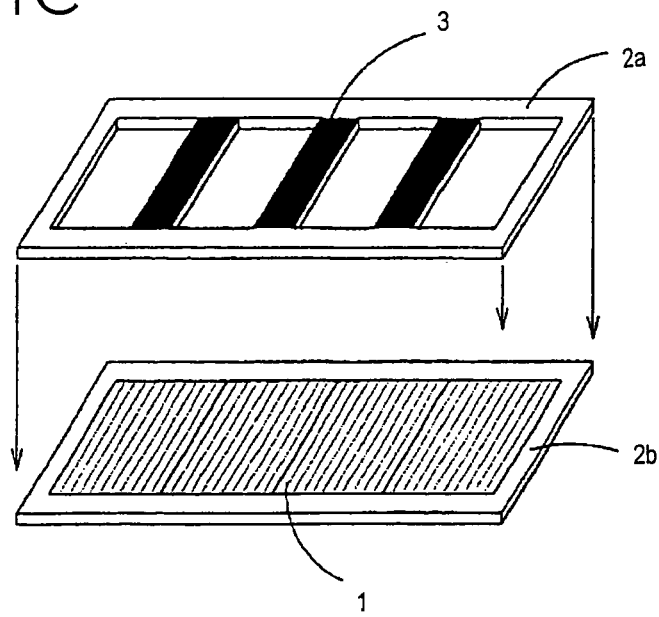
FIG. 1C is a perspective view thereof, in which light shielding plates are attached.

FIG. 1A is a schematic top plan view of a polarization element unit 10 according to a first embodiment of the present invention, which is viewed from the optical axis direction of emitted light. FIG. 1B is a side view thereof. FIG. 1C is a perspective view thereof, in which a light shielding plate is attached.

As shown in FIGS. 1A and 1B, two or more wire grid polarization elements 1 which are cut from a glass substrate are disposed in a frame 2 comprising an upper frame 2a and a lower frame 2 which are aligned side by side. Light shielding plates 3 are disposed on respective end portions (boundary portions) in an alignment direction of the polarization elements 1. The light shielding plates 3 are attached thereto as shown in FIG. 1C. That is, the frame 2 is formed by the upper frame 2a and the lower frame 2b, and on the lower frame 2b, two or more wire grid polarization elements 1 are aligned, and the upper frame 2a with which the light shielding plates are integrally formed is placed on and fixed to the lower frame 2b.

As shown in FIG. 1, although the illuminance of the portion where the light shielding plates 3 are formed, falls, a non-polarized light does not fall through the gaps between the polarization elements 1 which are aligned side by side, so that the extinction ratio does not fall.

Figure 2:
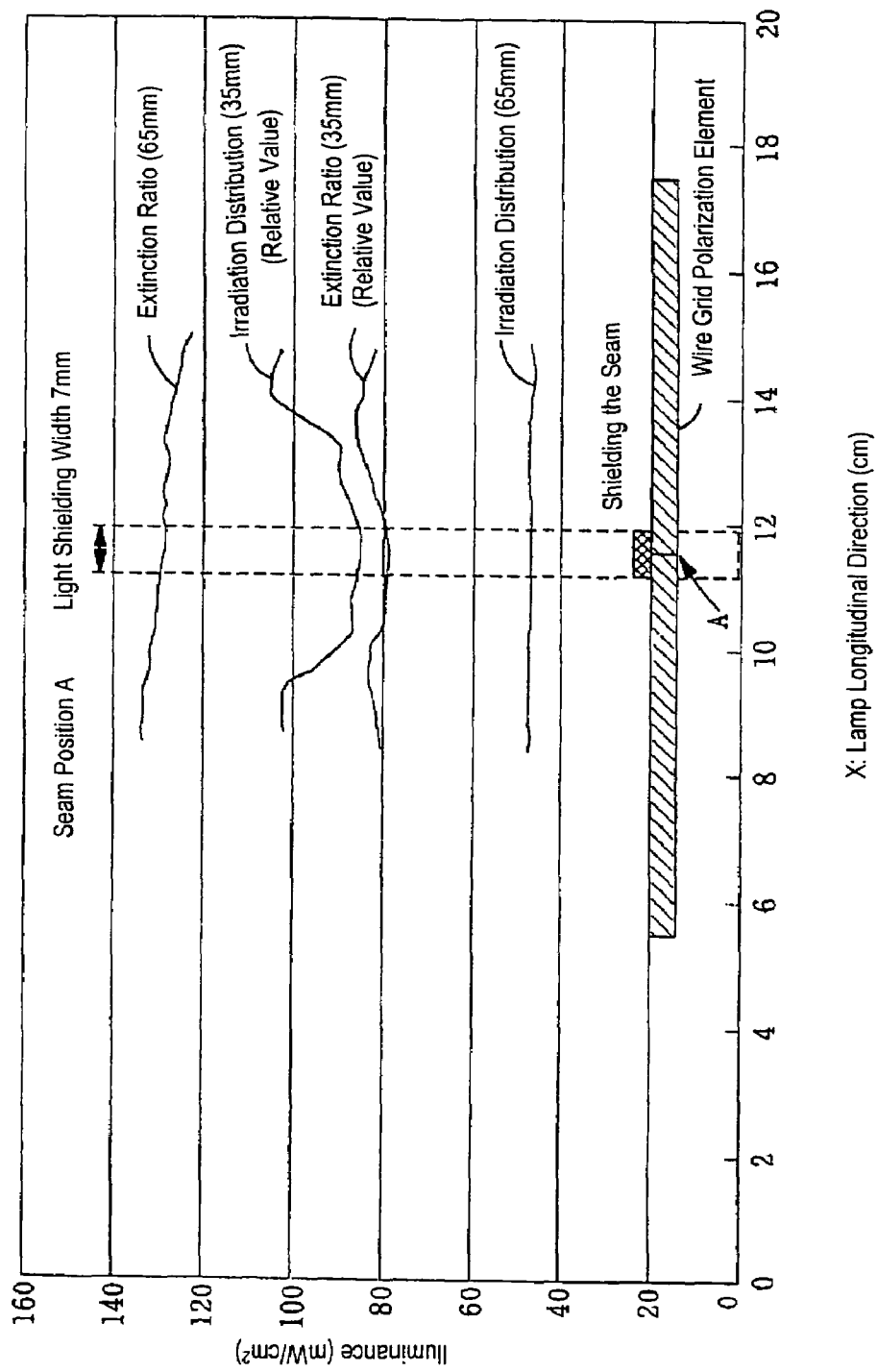
FIG. 2 shows the irradiance distribution in a light emitting area and distribution of an extinction ratio (relative value) in case of a polarization element unit according to the embodiment of the present invention.

The irradiance distribution in the light emitting area and distribution of an extinction ratio (relative value) in case of the polarization element unit according to the embodiment of the present invention is shown in FIG. 2. In the figure, the horizontal axis shows the position of a lamp in the longitudinal direction, and the vertical axis shows an illuminance, wherein a point A of this figure corresponds to the abutting portions (boundary portions) where two polarization elements are brought in abutting contact with each other.

In addition, the distance from the polarization element unit to a light exposed surface is 35 mm and 65 mm. As shown in this figure, deterioration of the extinction ratio is not generated in the boundary portions. However, due to existence of the light shielding section, the illuminance of each of the portions right under the light shielding plate becomes low, and irradiance distribution is deteriorated.

However, since the light emitted from the rod-shaped lamp is a diffused light, the light turns around and enters under a down side of the light shielding plate 3. Therefore, if the distance from the polarization element unit to the light exposed surface is changed from 35 mm to 65 mm, deterioration of the irradiance distribution can be compensated.

Figure 3A:
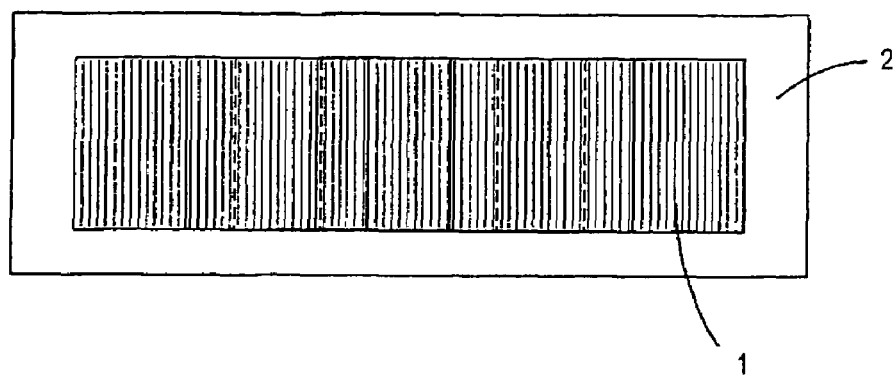
FIG. 3A is a top plan view of a polarization element unit 10 according to a second embodiment of the present invention, which is viewed from the optical axis direction of irradiation light.
Figure 3B:
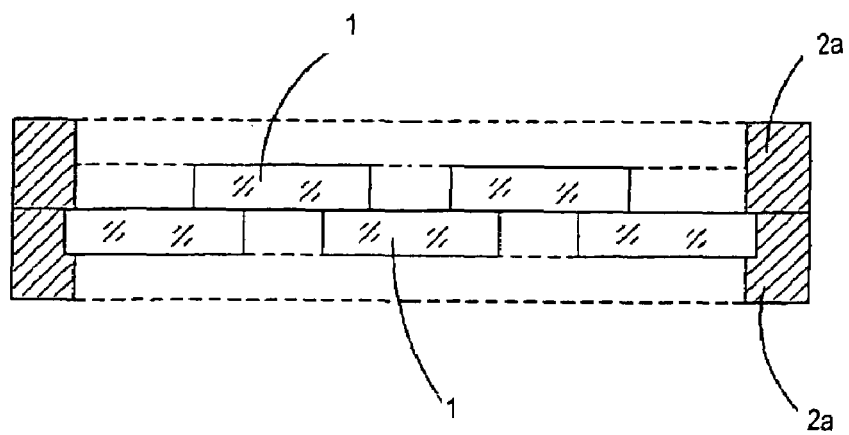
FIG. 3B is a side elevational view thereof.

FIG. 3A is a top plan view of a polarization element unit 10 according to a second embodiment of the present invention, which is viewed from the optical axis direction of irradiation light. FIG. 3B is a side elevational view thereof.

In this embodiment, although two or more wire grid polarization elements 1 are arranged side by side in the frame 2, edge portions thereof are arranged so as to overlap each other, and as shown in FIG. 3B, the polarization elements are sandwiched and fixed by the frames 2a and 2b.

Figure 4:
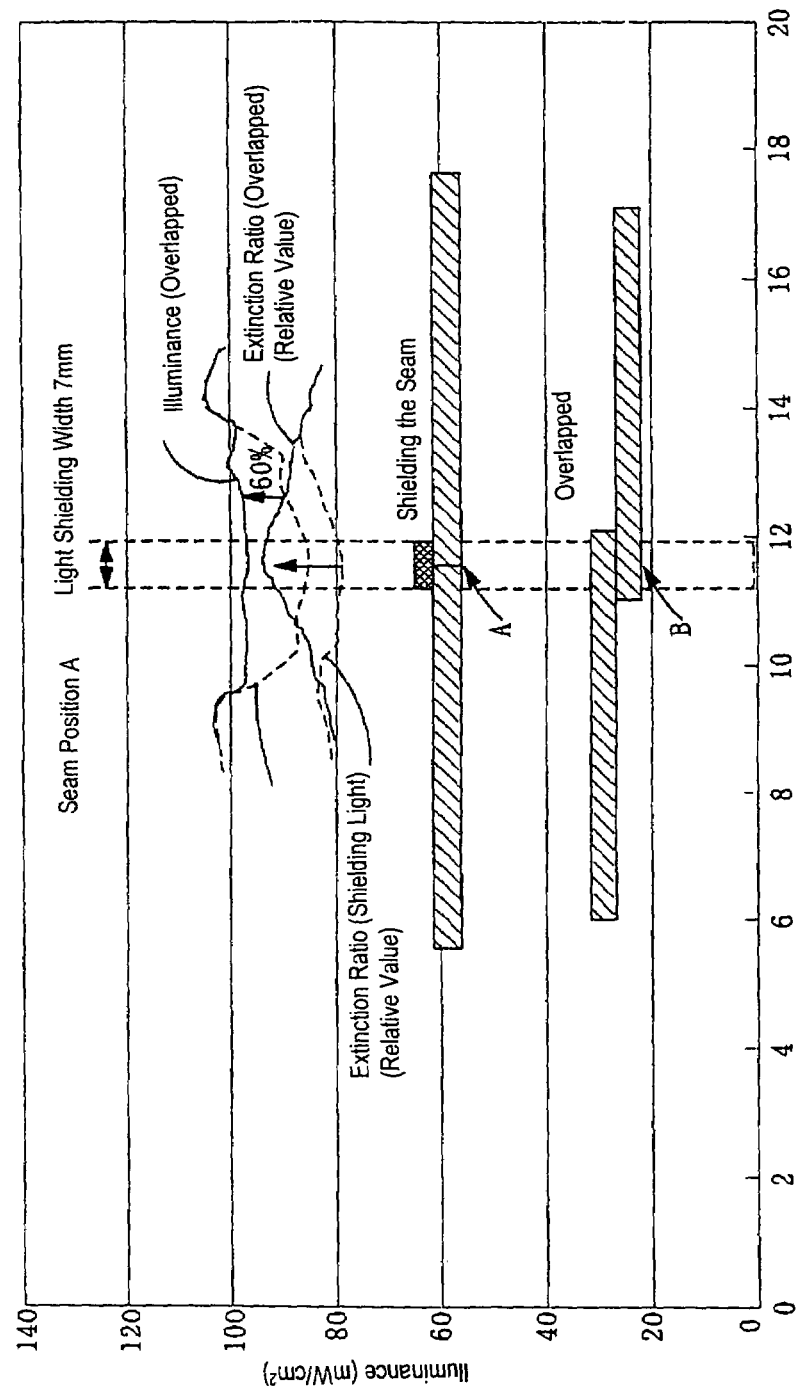
FIG. 4 shows the irradiance distribution in the light emitting area and distribution of an extinction ratio (relative value) in case of the polarization element unit according to this embodiment.

FIG. 4 shows the irradiance distribution in the light emitting area and distribution of an extinction ratio (relative value) in case of using the polarization element unit according to this embodiment. In the figure, the horizontal axis shows the position of the lamp in the longitudinal direction, the vertical axis shows an illuminance, wherein a point B of this figure corresponding to the abutting portion (boundary portions) where the polarization elements are overlapped each other. In addition, the distance from the polarization element unit to the light exposed surface is 35 mm, and the extinction ratio and irradiance distribution in case of providing a light shielding plate is shown for comparison by dotted lines.

As shown in the figure, in the case where the polarization elements are overlapped, the extinction ratio is rather improved due to the effect of superposition. Moreover, since light is not completely shielded even if they are overlapped each other, there is also less deterioration of the irradiance distribution compared with the case where the shielding plates are used. Since the transmittance of white light emitted from a wire grid polarization element is usually about 40% and that of a polarized light is 60%, the transmittance of the portion where the polarization elements are overlapped each other is 24%, so that there is less deterioration of irradiance distribution than the case where the light shielding plate is used.

Figure 5:
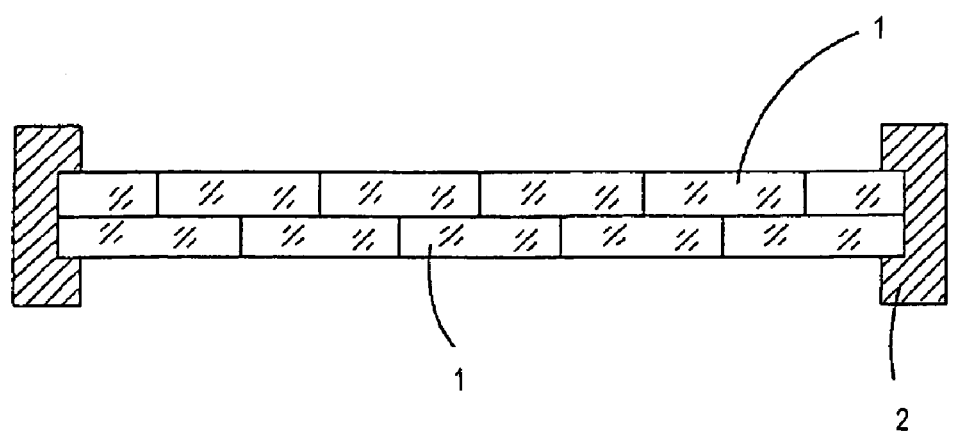
FIG. 5 is a side elevational view of a modified example of the polarization element unit according to the second embodiment.

FIG. 5 is a side elevational view of a modified example of the polarization element unit according to this embodiment. Although the polarization elements are partially overlapped each other in FIG. 3, the surfaces of polarization elements are entirely overlapped as shown in FIG. 5. Since the extinction ratio is improved when the polarizing plates are overlapped each other, even if an illuminance becomes low, the extinction ratio can be made to be good, and in case of making the irradiance distribution uniform, as shown in FIG. 5, the polarization elements are overlapped entirely so that the entire polarization elements are formed by double layers.

Figure 6A:
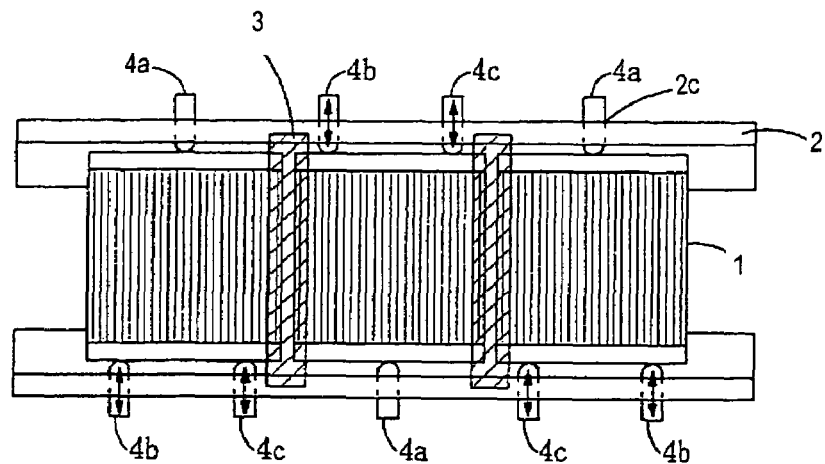
FIGS. 6A, to 6D are schematic views of a polarization element unit according to a third embodiment of the present invention, wherein a unit for rotating each of wire grid polarization elements with respect to the optical axis of light irradiated on the photo-alignment film from a light source is provided in a frame.
Figure 6B:
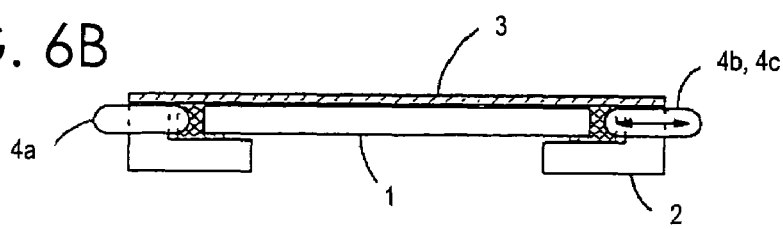
Figure 6C:
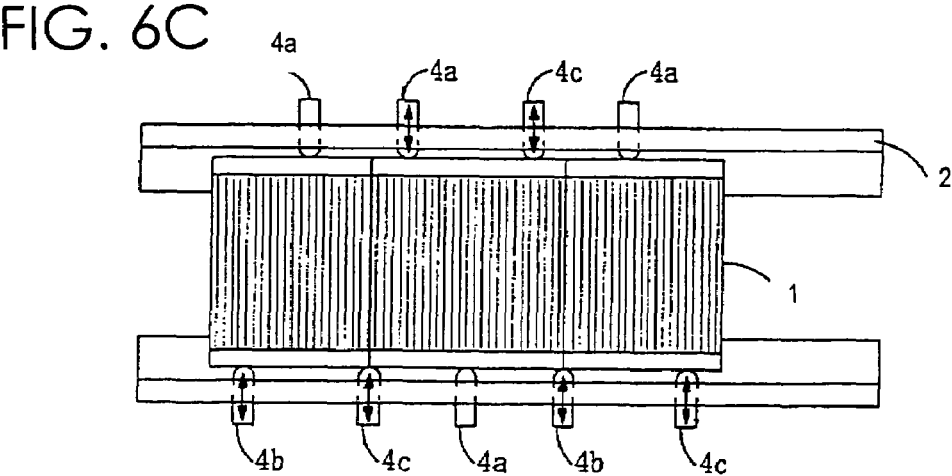
Figure 6D:
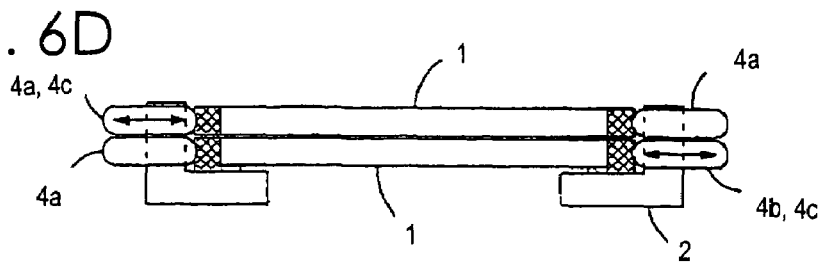

FIGS. 6A, 6B, 6C, and 6D are schematic views of a polarization element unit according to a third embodiment of the present invention, wherein a unit for rotating each of wire grid polarization elements with respect to the optical axis of light irradiated on the photo-alignment film from a light source is provided in a frame. FIGS. 6A and 6B show an example in which the present embodiment is applied to the polarization element unit according to the first embodiment, and FIGS. 6C and 6D show an example in which the present embodiment is applied to the second embodiment. FIGS. 6A and 6C are top plan views which is viewed from the optical axis of irradiation light of the polarization element unit, and FIGS. 6B and 6D are side elevational views thereof respectively.

As shown in these figures, screw holes 2C are formed in the frame 2, and screws 4a to 4C are attached therein. Each of the wire grid polarization elements 1 is fixed by a set of three screws 4a to 4c so as to push opposed side edges in a direction parallel to a plan of the polarization element 1.

Figure 7A:
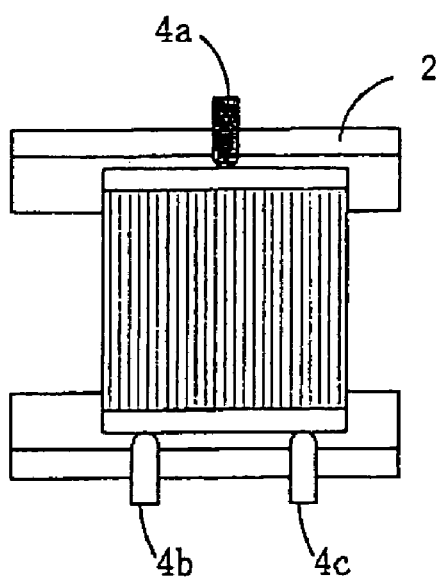
FIGS. 7A and 7B are explanatory views illustrating a method of adjusting rotational amount by screws according to the third embodiment.
Figure 7B:
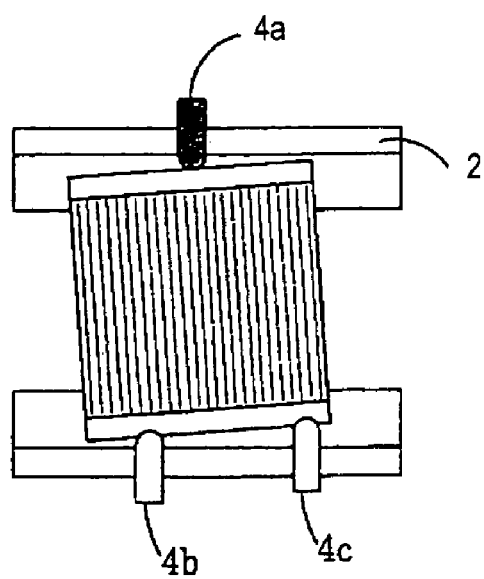

As shown in FIGS. 7A and 7B, if the screw 4a among these screws 4a to 4c is used as a supporting point, and the other screws 4b and 4c are pushed and pulled, each of the polarization elements 1 is rotated with respect to the optical axis of each polarization element 1. Thus, the positions of the polarization elements 1 can be adjusted by rotating them so that the grid directions of the aligned polarization elements are parallel to each other.

As described above, since misalignment between the cut surfaces and the grid direction may be generated by about ±0.5 degree, when the light shielding members are provided on the boundary portions of the polarization elements 1 as shown in FIGS. 6A and 6B, these polarization elements are aligned with a gap which allows these elements to rotate by ±1 degree, and the light shielding plates are provided so as to cover the gap.

Moreover, as shown in FIGS. 6C and 6D, when the polarization elements 1 are arranged so as to overlap each other, the polarization elements 1 are aligned in upper and lower sides. In such a case, the upper polarization elements 1 and the lower polarization elements 1 are arranged so as to be able to move independently. When the directions of the grid of the polarization elements 1 are adjusted, the frame of the polarizing unit is fixed, and a reference polarized light which has the polarization direction perpendicular or parallel to the frame, carries out incidence to each wire grid polarization element 10, so that transmittance thereof is measured by a measuring instrument. And each polarization element is rotated by screws 4b and 4c so that the transmittance of the reference polarized light becomes zero (0).

Figure 8A:
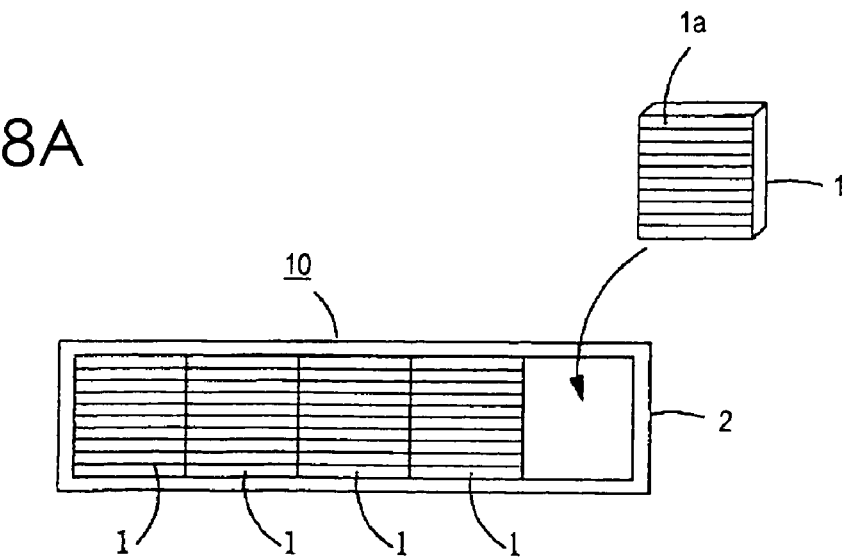
FIGS. 8A to 8C are explanatory view illustrating a way of aligning polarization elements.
Figure 8B:
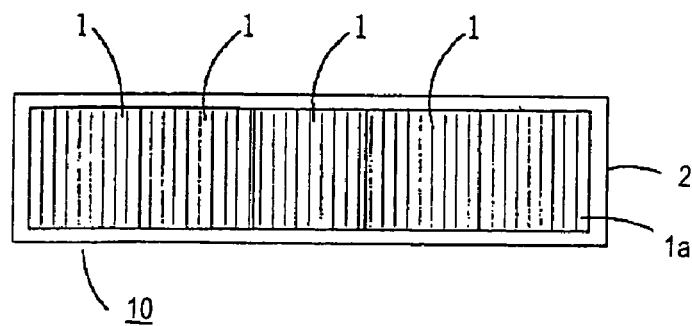
Figure 8C:
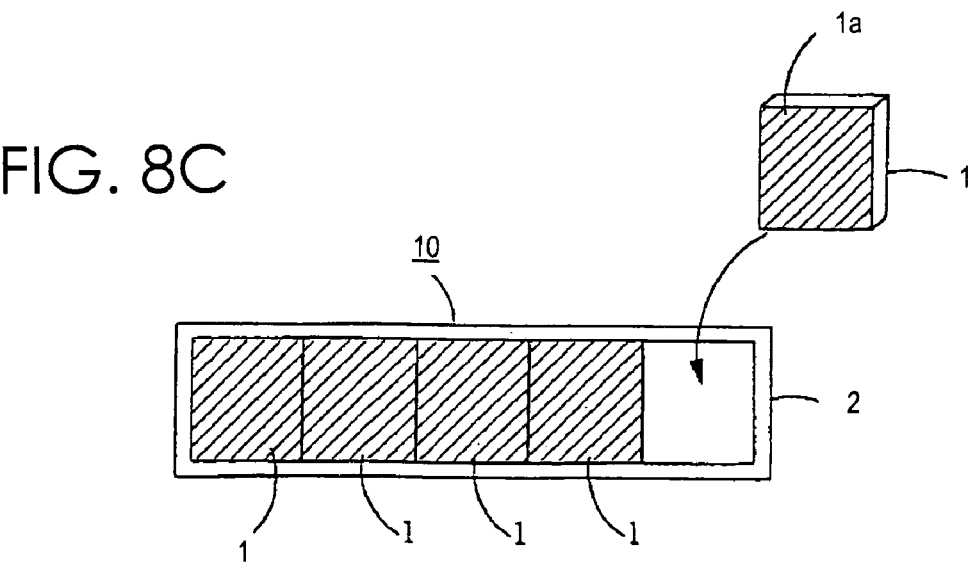

As shown in FIG. 8A, the direction of the wire grid 1a of each polarization element 1 may be parallel to the photo-alignment direction of polarization elements 1. Or, as shown in FIG. 8B, the direction may be orthogonal to the photo-alignment direction of a polarization elements 1. In addition, as shown in FIG. 8C, the direction of the wire grid 1a may be slanted with respect to the photo-alignment direction of the polarization elements 1.

Figure 9:
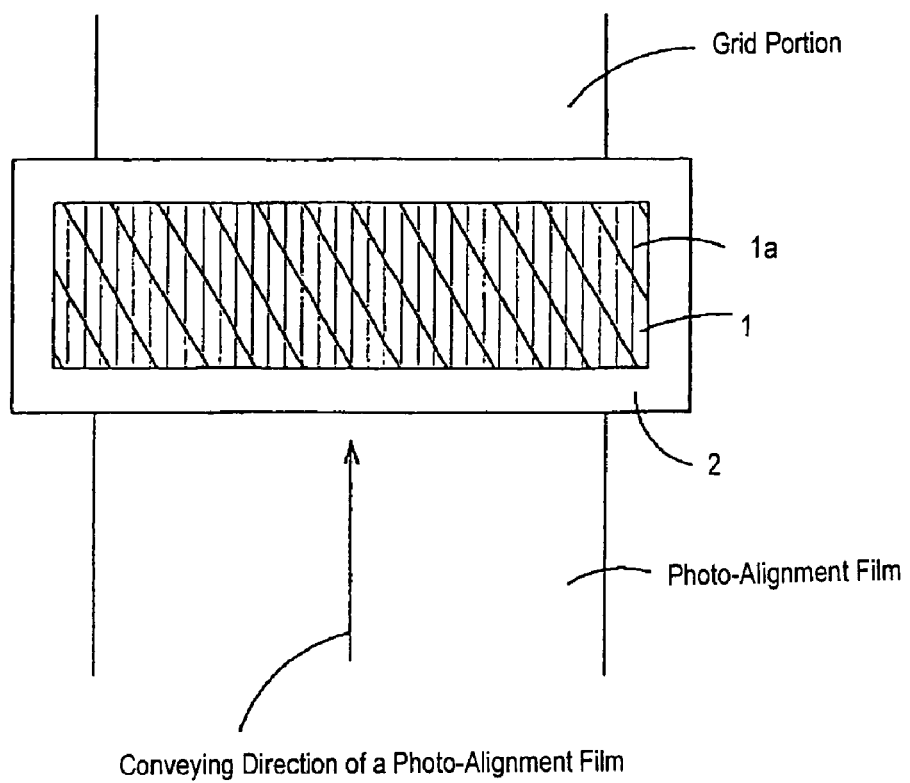
FIG. 9 shows an example of the polarization element unit using the polarization elements cut out in the shape of a parallelogram.

Moreover, although in each above-mentioned embodiment, square or rectangular wire grid polarization elements which are cut one by one from a glass wafer are used as polarizers, as shown in FIG. 9, the wire grid polarization elements having a parallelogram, or a triangle shape, may be cut from a glass wafer and arranged in the frame 2. The above-mentioned light shielding unit etc. is not shown in FIGS. 8 and 9.

By using parallelogram, or triangle polarization elements shown in FIG. 9, influence of deterioration of the irradiance distribution can be reduced at the time of applying the polarization element unit according to the present invention to the polarized light emitting apparatus, which irradiates a polarized light while unidirectionally conveying, for example, a photo-alignment film.

That is, even if the light shielding plates are provided on the boundary surfaces, it is possible to reduce the influence of deterioration of irradiance distribution, since the boundary line of the polarization element 1 is arranged so as to be slanted with respect to the photo-alignment film conveying direction, so that the areas where the illuminance is decreased by the light shielding plates, moves in a width direction of the photo-alignment film while the photo-alignment film is conveyed, thereby diluting each other as a whole.

Next, the polarized light emitting apparatus using the polarization element unit 10 according to the present invention is explained.

Figure 16:
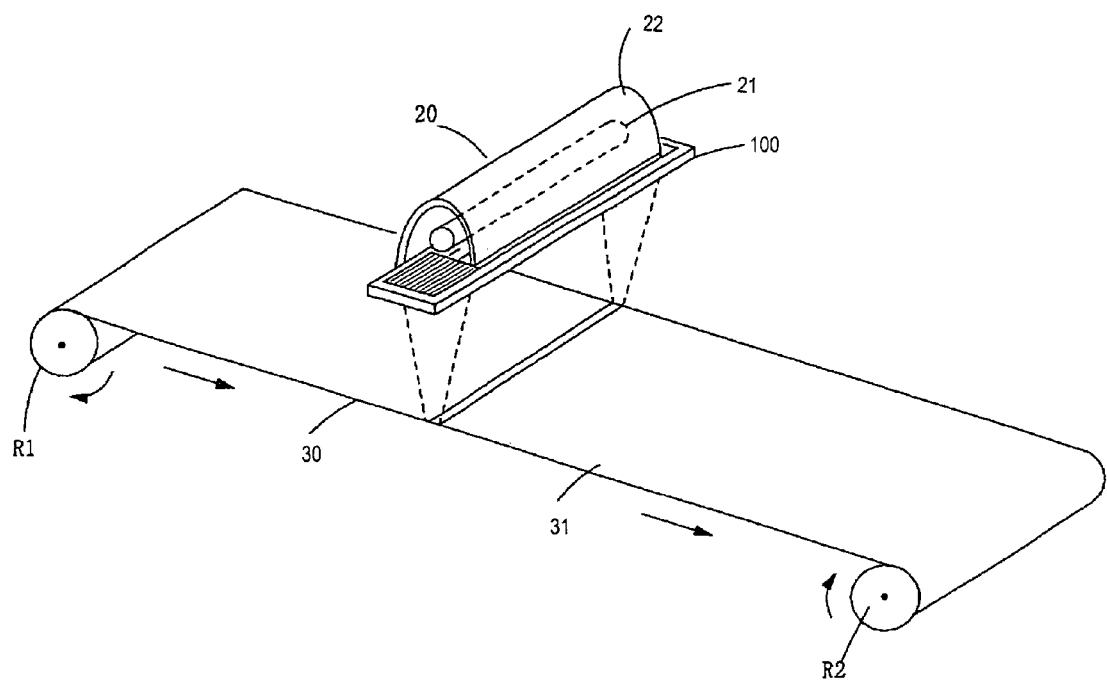
FIG. 16 shows an example of a polarized light emitting apparatus having a polarization unit in which a wire grid polarization element is combined with a rod shape lamp, which is a rod shape light source.
Figure 17A:
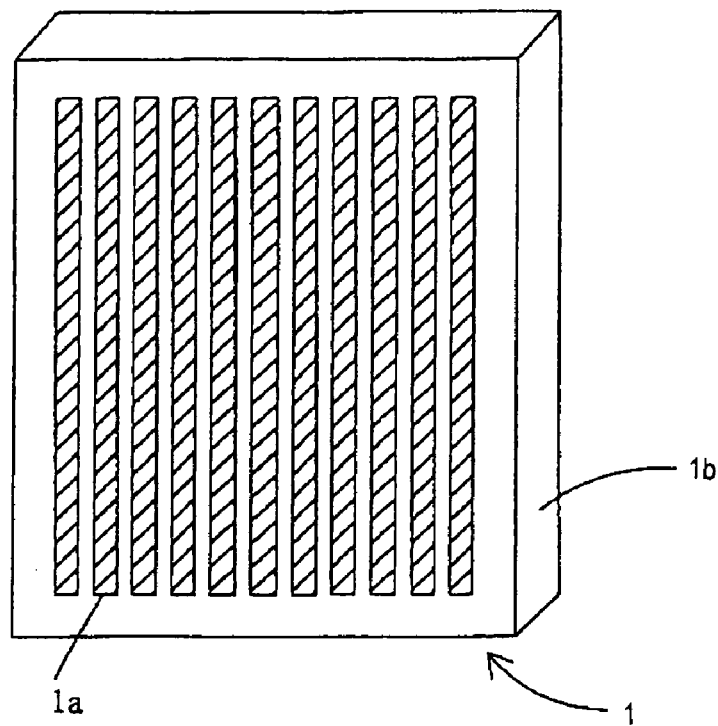
FIG. 17A is a perspective view of an overview of the wire grid polarization element which forms the wire grid polarization unit.
Figure 17B:
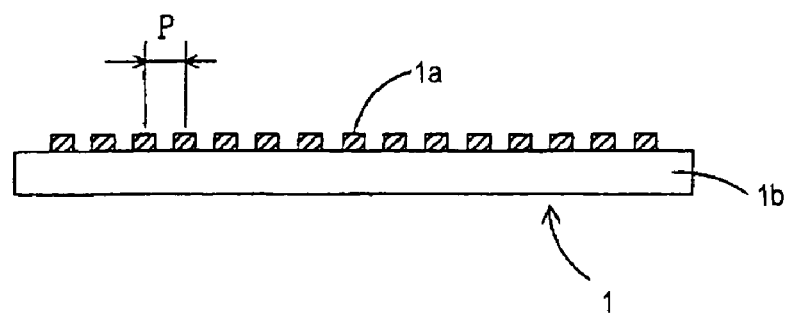
FIG. 17B is a side view thereof, wherein two or more linear electric conductors 1a whose length is much longer than the width thereof are in parallel arranged on a substrate 1b made of, for example, quartz glass.
Figure 18:
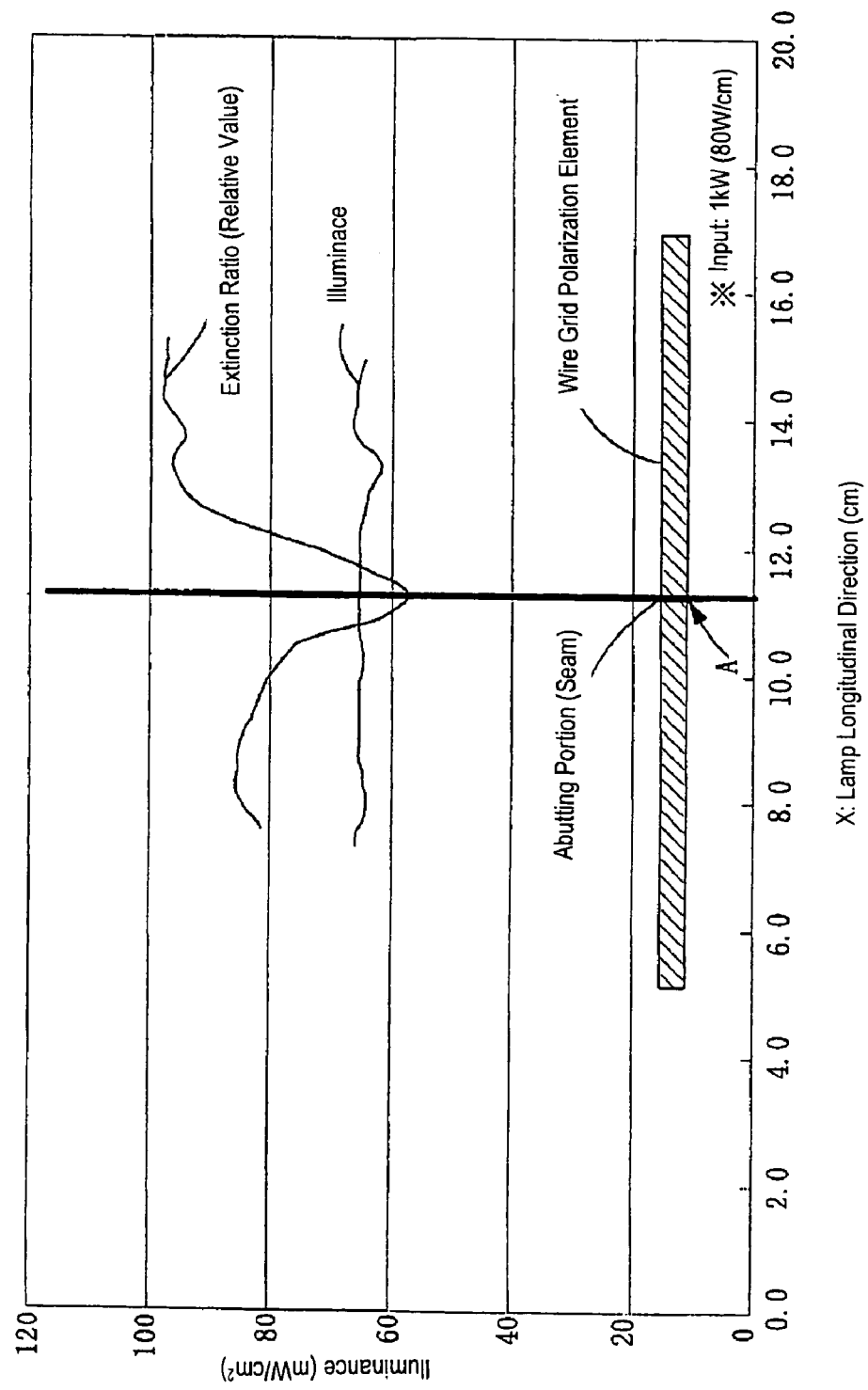
FIG. 18 shows the extinction ratio (relative value) and irradiance distribution in the light emitting area in case that two wire grid polarization elements which are cut out of a glass substrate are aligned.

When a photo-alignment of a belt-like long workpiece such as a viewing angle compensation film etc. is carried out, the polarization element unit 10 shown in the above-mentioned embodiment is used as a polarization unit 100 of the polarized light emitting apparatus shown in FIG. 16.

In addition, since in recent years, an LED or LD, which emits ultraviolet radiation, has been also put in practical use, two or more LEDs or LDs may be linearly arranged side by side in place of the rod-shaped lamp 21, as the linear light source. In that case, the LED or LD arranging direction corresponds to the longitudinal direction of the lamp.

Moreover, right now, photo-alignment film materials, photo-aligned by light having 260 mm ±20 nm wavelength, 280 nm to 330 nm wavelength, and 365 nm wavelength are known so that the light source is selected according to wavelength which is required for the material to be used.

In FIG. 16, when the workpiece 30 pulled out from the supply roller R1 is conveyed under the light emitting portion, the light from the rod-shaped lamp 21 which is polarized by the polarization element unit according to the present invention, is emitted onto the photo-alignment film 31 of the workpiece 30, thereby carrying out photo-alignment processing. By using the polarization element unit 10 according to the present invention as a polarization unit 100, the light emitted from the lamp 21 which is a linear light source is polarized without partially reducing the extinction ratio thereof, and is irradiated on the photo-alignment film 31 thereby carrying out the photo-alignment.

In addition, when the polarized light is irradiated on the photo-alignment film 31, the workpiece 30 may be continuously or intermittently moved while it is irradiated by the polarized light. In order to move the workpiece 30 intermittently, for example, an operation of moving the workpiece 30 by a predetermined distance, stopping the workpiece 30, irradiating the polarized light onto the workpiece 30, and stopping irradiation of the polarized light, is repeated.

Although, in FIG. 16, as an example, the belt-like long workpiece winded in a shape of a roll is irradiated with the polarized light, the workpiece 30 is not limited to the belt-like long workpiece in the present invention and may have any shape.

Figure 10:
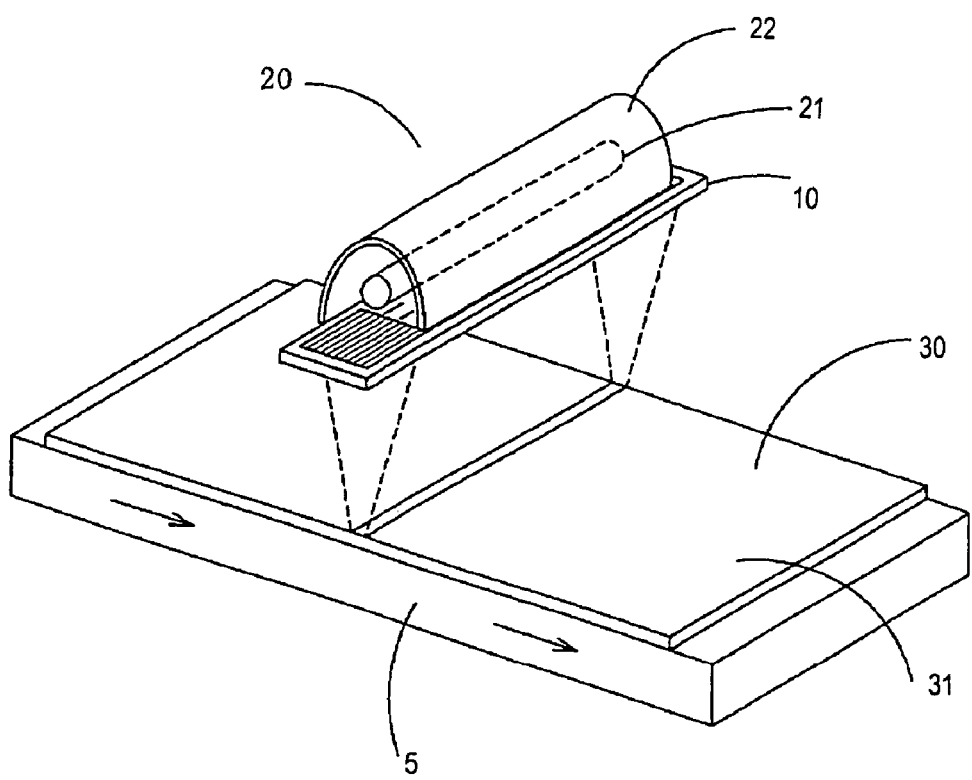
FIG. 10 is a perspective view of a polarizing light emitting apparatus for irradiating polarized light on a workpiece, which is not belt-like long workpiece.

FIG. 10 is a perspective view of a polarizing light emitting apparatus for irradiating polarized light on a workpiece 30, which is not belt-like long workpiece. The light emitting unit 20 is supported by a support unit (not shown) on a workpiece stage 5. As in FIG. 16, the lamp 21 such as a high-pressure mercury lamp and a metal halide lamp, and a gutter-shaped condensing mirror 22 having a shape of an ellipse in a cross-sectional view which reflects light from the rod-shaped lamp 21, are formed in the light emitting unit 20, and further, the wire grid polarization element unit 10 according to the present invention is provided so that the longitudinal direction of the polarization element unit 10 is in agreement with the longitudinal direction of the lamp 21.

The workpiece 30 that a photo-alignment film 31 is formed in and is shaped in, for example, a size of a liquid crystal panel, is placed on the workpiece stage 5, which moves in a direction approximately orthogonal to the rod-shaped lamp of the light emitting unit 20 (in the direction of an arrow of the figure). The rod-shaped lamp 21 is arranged so that the longitudinal direction of the rod-shaped lamp 21 is in agreement with the longitudinal direction of the gutter-shaped condensing mirror 22 and so that the position of the lamp 21 is in agreement with the first focal point of the gutter-shaped condensing mirror 22 having the shape of an ellipse in a cross sectional view, and, further, the photo-alignment film 31 formed on the workpiece 30 is arranged so as to be at the second focal point of the gutter-shaped condensing mirror 22. The polarized light is irradiated on the photo-alignment film 31 of the workpiece 30 by moving the workpiece stage 5 on which the workpiece 30 is placed, in a direction shown by arrows of the figure while the polarized light is irradiated thereon from the light emitting unit 20, so that a photo-alignment process is carried on the workpiece 30.

As described above, when the polarized light is irradiated on the photo-alignment film 31, the workpiece 30 may be continuously or intermittently moved while it is irradiated by the polarized light.

Moreover, the photo-alignment processing may be carried out on the workpiece 30 by moving the light emitting unit 20 above the workpiece 30 in place of moving the workpiece stage 5.

Figure 11:
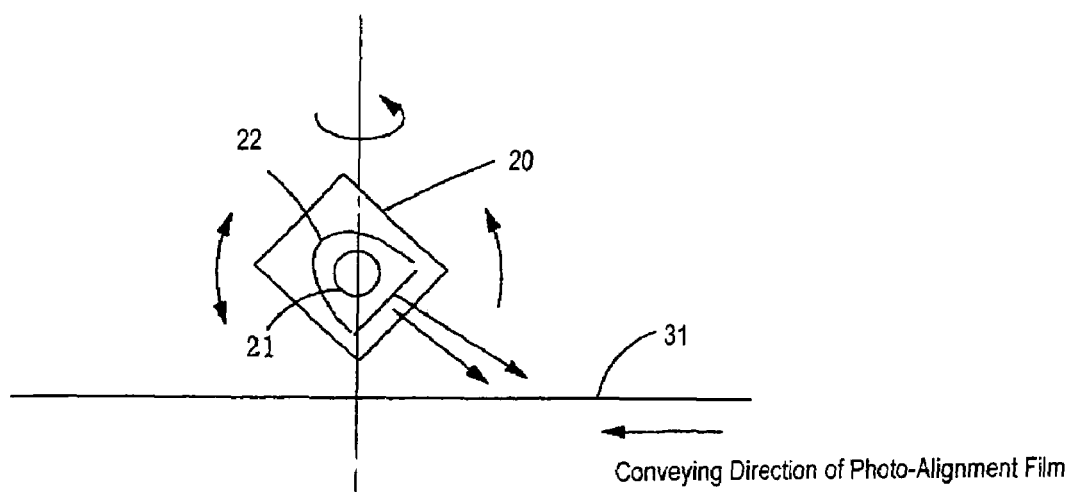
FIG. 11 is the light emitting portion, which is leaned so that the polarized light carries out slanted incidence to the photo-alignment film.

In the above embodiments, the polarized light from the light emitting unit carries out incidence basically perpendicularly to the photo-alignment film. On the other hand, as shown in FIG. 11, slanted incidence of the polarized light with respect to the photo-alignment film may sometimes be required. For example, this is carried out in order to raise liquid crystal with respect to a photo-alignment film by a predetermined (pre-tilt) angle.

Figure 12:
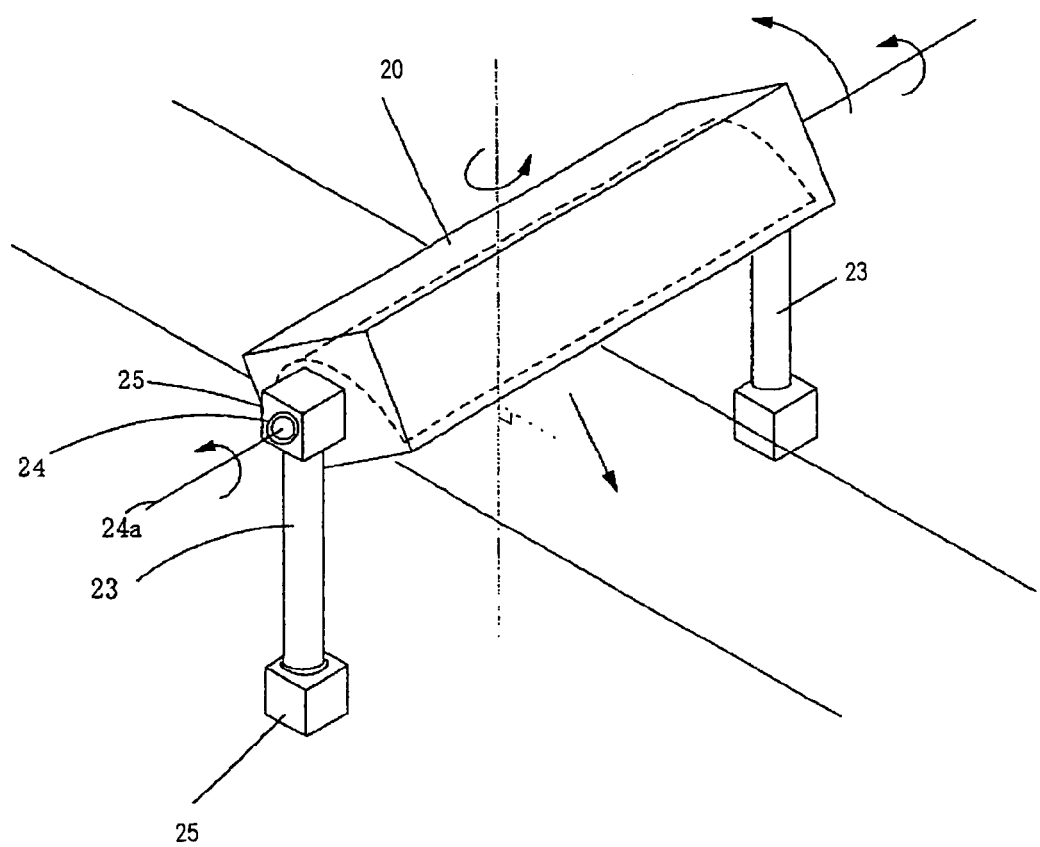
FIG. 12 is a perspective view of a polarizing light emitting apparatus and a workpiece, wherein polarized light carries out slanted incidence to the workpiece.

In order to make the optical axis of the polarized light from the light emitting unit slanted with respect to the photo-alignment film 31, as shown in FIG. 12, the light emitting unit 20 is rotatably attached, by rotation bearings 24, to blocks 25 for connecting the light emitting unit 20 to supports 23 for supporting the light emitting unit 20. An axis 24a of a rotational-axis receptacle is approximately in agreement with the central axis of the lamp in the longitudinal direction, which is formed in the light emitting unit 20, and the light emitting unit 20 rotates in the direction of an arrow of this figure focusing on axis 24a.

Thereby, it is possible to rotate (swing) the light emitting unit 20 with respect to an axis orthogonal to the moving direction of the light emitting unit 20 or the photo-alignment film 31, and parallel to the surface of the photo-alignment film 31 and the photo-alignment film 31.

Moreover, a fixing unit for holding the light emitting unit 20 in a state in which the light emitting unit 20 is slanted is provided if necessary.

When the polarized light is irradiated at a slant, the light emitting unit 20 is rotated (swung), by the rotation bearings provided in the blocks, with respect to an axis parallel to the photo-alignment film 31 so that the optical axis is adjusted so as to be at a desired angle.

As shown in FIG. 11, when polarized light carries out slanted incidence to the light emitting unit 20 by slanting the light emitting unit 20, unless the rotation bearings are not moved, the distance form the lamp to the photo-alignment film 31 in case that the polarized light carried out a perpendicular incidence to the photo-alignment film 31 changes, is different from that in case the polarized light carries slanted incidence thereto. That is, as compared with the case where polarized light carries out a perpendicular incidence, the distance from the light emitting unit to the light emitting film 31 becomes longer in case where the light carries out slanted incidence.

Therefore, the following structure may be adopted in order not to generate such change to the distance, even if the light emitting unit 20 is slanted.

Figure 13A:
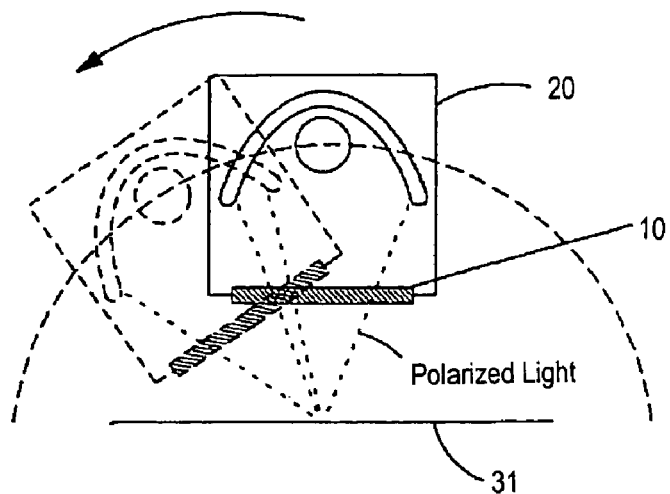
FIGS. 13A to 13C are explanatory diagrams of illustrating that the distance between a lamp and a photo-alignment film does not change even if the light emitting unit is leaned so that light carries out slanted incidence to a workpiece.

(a) As shown in FIG. 13A, the light emitting unit 20 is structured so as to swing like a pendulum, so that the center of the lamp 21 of the light emitting unit 20 moves on a circular are whose center is the light emitted surface.

Figure 13B:
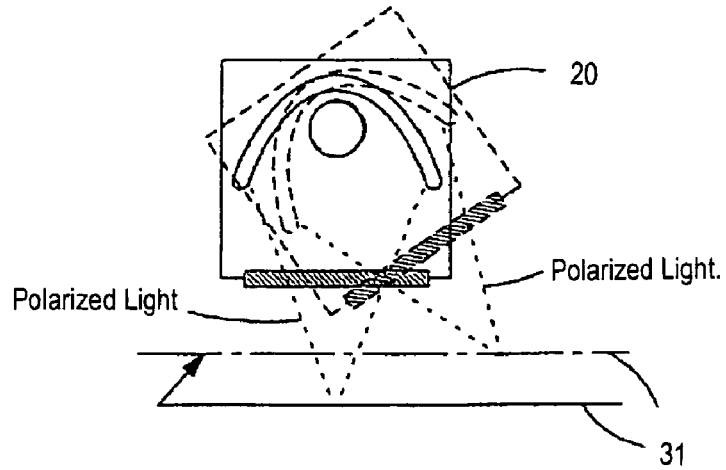

(b) As shown in FIG. 13B, when the light emitting unit 20 is leaned, the conveying surface of the photo-alignment film 31 is brought closer to the light emitting unit 20 so that the distance between the lamp 21 and the light emitted surface becomes equal to that in case of the perpendicular incidence.

Figure 13C:
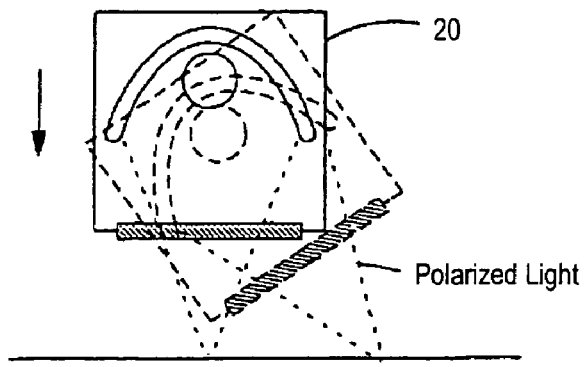

(c) As shown in FIG. 13C, when the light emitting unit 20 is leaned, the light emitting unit 20 is brought closer to the photo-alignment film 31 so that the distance between the lamp 21 and the light emitted surface becomes equal to that in case of the perpendicular incidence.

Figure 14:
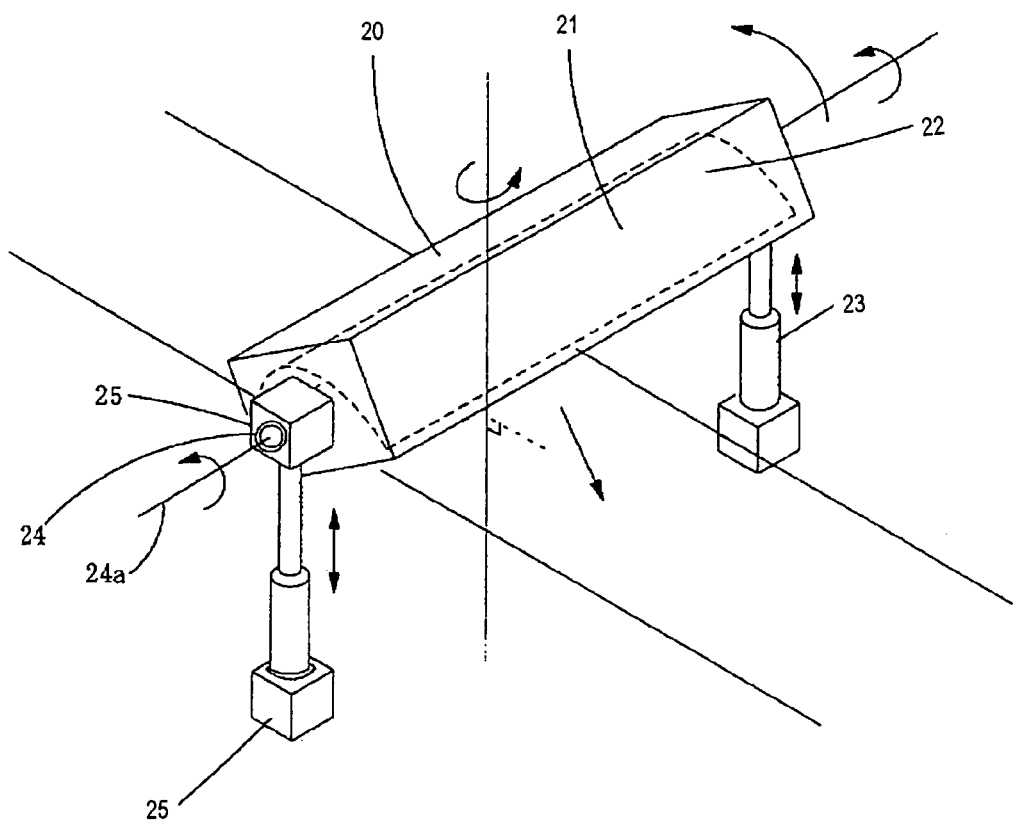
FIG. 14 is a perspective view of an apparatus capable of bringing the light emitting unit closer to the photo-alignment film when the light emitting portion is leaned, as described in FIG. 13C.

FIG. 14 is a perspective view of an apparatus capable of bringing the light emitting unit closer to the photo-alignment film when the light emitting portion is leaned, as described in FIG. 13C. The two supports 23 of FIG. 12 for supporting the light emitting unit 20, are structured in a cylinder shape so as to be able to expand and contract so that the light emitting unit 20 can be moved vertically.

Thereby, when the light emitting unit 20 is leaned, the supports are shortened so that the light emitting unit 20 is brought closer to the photo-alignment film 31, whereby it is possible to adjust the distance between the light emitting unit 20 and the photo-alignment film 31 so as to be constant.

Figure 15A:
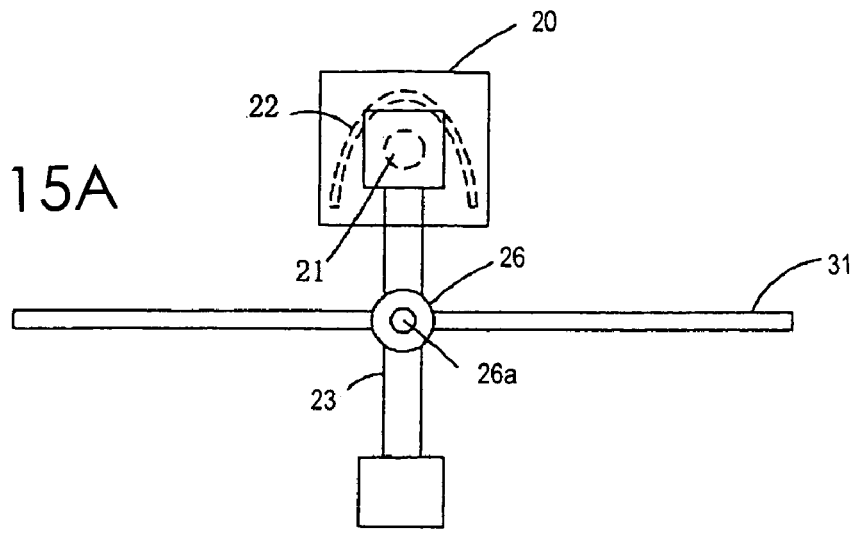
FIGS. 15A and 15B are explanatory diagrams showing an example of an apparatus in which a light emitting unit can be leaned as a pendulum.
Figure 15B:
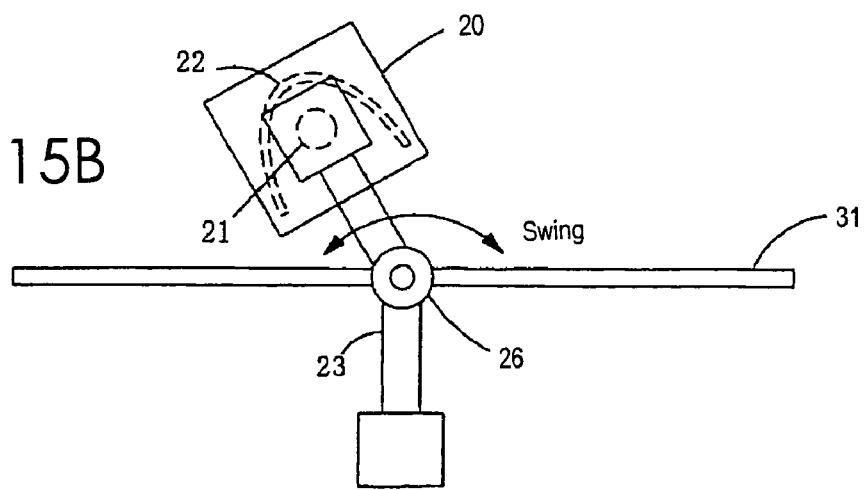

FIGS. 15A and 15B are side views of an apparatus wherein the light emitting unit 20 shown in FIG. 13A is in a normal position and a leaned position like a pendulum, respectively. The light emitting unit 20 is supported by the two supports 23 which have joint sections 26, respectively. A rotational axis 26a of each of joint sections 26 is on is (in agreement with) a face extending the photo-alignment film 31, and the light emitting unit 20 swings on the circular arc with respect to the rotational axis 26a.

As shown in FIG. 15A, the polarized light can carry out perpendicular incidence to the photo-alignment film 31 by uprighting the light emitting unit 20, and the polarized light can be irradiated at a slant to the photo-alignment film 31 by leaning the light emitting unit 20, as shown in FIG. 15B. Since the light emitting unit 20 rotates with respect to the rotational axis 26a as an axis of the light emitting unit 20, even if the light emitting unit 20 is leaned at any angle, the distance between the light emitting unit 20 and the photo-alignment film 31 does not change.

Although only some exemplary embodiments have been described in detail above, those skilled in the art will readily appreciate that many modifications are possible in the exemplary embodiments without materially departing from the novel teachings and advantages. Accordingly, all such modifications are intended to be included within the scope.

The disclosure of Japanese Patent Application No. 2004-314056 filed on Oct. 28, 2004 including specification, drawings and claims is incorporated herein by reference in its entirety.

What is claimed is:

1. A polarization element unit comprising:
two or more wire grid polarization elements;
a frame in which the polarization elements are aligned side by side; and
a rotation unit including a first, second and third members, which are movable in a direction approximately parallel to a plane of at least one of the two or more wire grid polarization elements,
wherein the at least one of the two or more polarization elements whose first side is in contact with the first member and whose second side is in contact with the second member and the third member, so that a grid direction of the at least one of the two or more wire grid polarization elements are adjusted with respect to an optical axis of light emitted onto a photo-alignment film from the linear light source approximately on the plane of the at least one of the two or more wire grid polarization elements by moving the first, second and third members in a direction approximately parallel to the plane of the at least one of the two or more polarization elements.

2. A polarized light emitting apparatus for photo-alignment in which polarized light from the light emitting unit is emitted onto a photo-alignment film, comprising: a light emitting unit that polarizes light emitted from a linear light source, wherein the polarization element unit according to claim 1 is used as a polarizer.

3. The polarization element unit according to claim 1, wherein a grid direction of the two or more wire grid polarization elements is parallel to a photo-alignment direction of the two or more wire grid polarization elements.

4. The polarization element unit according to claim 1, wherein a grid direction of the two or more wire grid polarization elements is orthogonal to a photo-alignment direction of the two or more wire grid polarization elements.

5. The polarization element unit according to claim 1, wherein a grid direction of the two or more wire grid polarization elements is at a slant with respect to a photo-alignment direction of the two or more wire grid polarization elements.

6. The polarization element unit according to claim 1, wherein the frame comprises an upper frame member and a lower frame member.

7. The polarization element unit according to claim 1, wherein the polarization elements are entirely overlapped.

8. A polarization element unit comprising:
two or more polarization elements;
a frame in which the polarization elements are aligned side by side; and
a first, second and third members movable in a direction approximately parallel to a plane of at least one of two or more polarization elements;
wherein the at least one of the two or more polarization elements whose first side is in contact with the first member and whose second side is in contact with the second member and the third member, so that a grid direction of the at least one of the two or more polarization elements are adjusted with respect to an optical axis of light emitted onto a photo-alignment film from the linear light source by moving the first, second and third members in the direction approximately parallel to the at least one of the at least one of the two or more polarization elements.

9. The polarization element unit according to claim 8, wherein a set of the first, second and third members is provided for each of the two or more polarization elements.

10. A polarization element unit comprising:
two or more polarization elements;
a frame in which the two or more polarization elements are aligned side by side; and
a first, second and third members, which are attached to the frame movably in a direction approximately parallel to a plane of the two or more polarization elements,
wherein the first member is in contact with one of the two or more polarization elements and the second member and the third member are in contact with a second side of the one of the two or more polarization elements, and
wherein the first, second and third members are slidable in a direction approximately parallel to the one of the two or more polarization elements, so that the one of the two or more polarization elements is capable of being rotated with respect to an optical axis of light emitted onto a photo-alignment film on the plane approximately parallel to the one of the two or more polarization elements while an incident angle of the light with respect to the photo-alignment film is maintained.

11. The polarization element unit according to claim 1, further including at least one shielding member, provided so as to cover an abutting portion of the two or more wire grid polarization elements.

12. The polarization element unit according to claim 1, wherein edge portions of the two or more wire grid polarization elements are overlapped.

13. The polarization element unit according to claim 1, wherein each of the first, second, third members is a screw which is slidably attached to the frame through respective holes provided in the frame.

14. The polarization element unit according to claim 1, wherein a shape of each of the wire grid polarization elements is parallelogram.

15. The polarization element unit according to claim 1, wherein each of the two or more polarization elements are adjustable individually.

16. The polarization element unit according to claim 8, wherein each of the two or more polarization elements are adjustable individually.

17. The polarization element unit according to claim 10, wherein each of the two or more polarization elements are adjustable individually.

* * * * *